United States Patent
Summer et al.

(10) Patent No.: US 9,144,907 B2
(45) Date of Patent: Sep. 29, 2015

(54) CONTROL SYNCHRONIZATION FOR HIGH-LATENCY TELEOPERATION

(71) Applicant: HARRIS CORPORATION, Melbourne, FL (US)

(72) Inventors: Matthew D. Summer, Melbourne, FL (US); Paul M. Bosscher, West Melbourne, FL (US); Michael J. Summer, Melbourne, FL (US); Miguel Ortega-Morales, Vero Beach, FL (US)

(73) Assignee: Harris Corporation, Melbourne, FL (US)

(*) Notice: Subject to any disclaimer, the term of this patent is extended or adjusted under 35 U.S.C. 154(b) by 55 days.

(21) Appl. No.: 14/062,632

(22) Filed: Oct. 24, 2013

(65) Prior Publication Data

US 2015/0120048 A1    Apr. 30, 2015

(51) Int. Cl.
B25J 9/16    (2006.01)

(52) U.S. Cl.
CPC ............. B25J 9/1692 (2013.01); B25J 9/1689 (2013.01); *G05B 2219/40147* (2013.01); *G05B 2219/40149* (2013.01); *G05B 2219/40151* (2013.01); *G05B 2219/40174* (2013.01); *Y10S 901/02* (2013.01)

(58) Field of Classification Search
CPC ........... G05B 2219/34406; G05B 2219/40147; G05B 2219/40151
See application file for complete search history.

(56) References Cited

U.S. PATENT DOCUMENTS

| | | | |
|---|---|---|---|
| 5,548,516 A * | 8/1996 | Gudat et al. | 701/23 |
| 2006/0109376 A1 * | 5/2006 | Chaffee et al. | 348/423.1 |
| 2007/0058929 A1 * | 3/2007 | Chaffee | 386/78 |
| 2007/0156286 A1 * | 7/2007 | Yamauchi | 700/245 |
| 2008/0276408 A1 * | 11/2008 | Gilbert et al. | 15/320 |
| 2009/0157233 A1 * | 6/2009 | Kokkeby et al. | 701/3 |
| 2010/0070079 A1 | 3/2010 | Mangaser et al. | |
| 2011/0087371 A1 * | 4/2011 | Sandberg et al. | 700/245 |

FOREIGN PATENT DOCUMENTS

WO    WO 2009091536 A1 *  7/2009  ............... G05D 1/00

OTHER PUBLICATIONS

Information about Related Patents and Patent Applications, see section 6 of the accompanying Information Disclosure Statement Letter, which concerns Related Patents and Patent Applications.

* cited by examiner

*Primary Examiner* — Khoi Tran
*Assistant Examiner* — Ryan Rink
(74) *Attorney, Agent, or Firm* — Robert J Sacco, Esq.; Fox Rothschild LLP

(57) ABSTRACT

Robotic system (100) includes a processing device (512) and a plurality of robot actuators (501) to cause a specified motion of the robot (102). The processing device (512) responds to one or more user robot commands (115) initiated by a control operator input at a remote control console (108). A user robot command will specify a first movement of the robot from a first position to a second position. The processing device will compare a current pose of the robot to an earlier pose of the robot to determine a difference between the current pose and the earlier pose. Based on this comparing, the processing device will selectively transform the user robot command to a latency-corrected robot command which specifies a second movement for the robot which is different from the first movement.

23 Claims, 7 Drawing Sheets

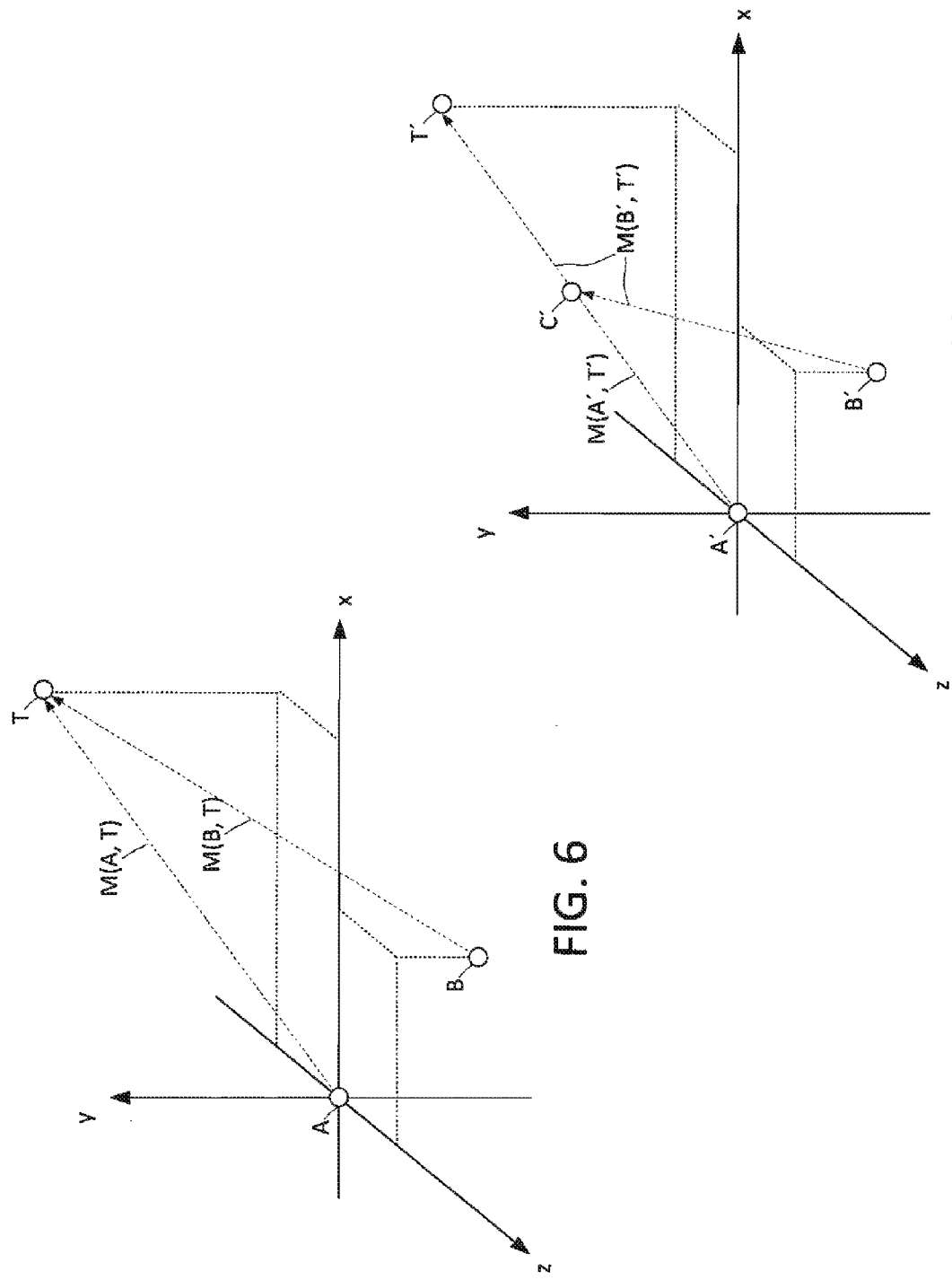

CONTROL SYNCHRONIZATION FOR HIGH-LATENCY TELEOPERATION

BACKGROUND OF THE INVENTION

1. Statement of the Technical Field

The inventive arrangements relate to teleoperation systems, and more particularly to teleoperation systems that operate in a high latency environment.

2. Description of the Related Art

Teleoperation involves the manipulation and control of objects and devices over long distances. A teleoperation system usually includes an unmanned robotic system and a user control console. A data link facilitates communications between the control console and the unmanned robotic system so that user commands can be provided to the unmanned robotic system which is usually located some distance away. Most unmanned robotic systems are controlled over a wireless link. Unmanned remotely controlled systems include unmanned aerial vehicles (UAV), unmanned ground vehicles (UGV), unmanned underwater vehicles (UUV) and robotic manipulators. An unmanned remotely controlled system as described herein can sometimes include a movable vehicle portion (e.g. a tracked base unit in the case of a UGV) and a robotic arm with a grasping element for manipulating objects in the field.

A control console for an unmanned robotic system will generally include some type of user input device for receiving user control inputs. The user input device can take many forms. A typical arrangement can include a joystick or movable grip handle which the user can urge in various directions to cause appropriate movements or actions of the unmanned robotic system. In systems that include a movable vehicle portion and a robotic arm portion, the user input device can be used to control the vehicle position, robot arm position, or both. If the robotic arm includes a grasping device, the user input device can include a suitable control element for opening and closing mechanical fingers provided on the grasping device.

An imaging system is typically provided to facilitate remote control operation of an unmanned robotic system. The imaging system will usually include a camera mounted to a portion of the unmanned robotic system and a display unit located at the operator console. The system is arranged so that live motion images (video) collected by the camera is communicated using the data link to the operator console, where the live motion images are then presented to the user on the display unit. In an ideal scenario, the live motion images will be communicated to the user display on a near instantaneous basis so that the user will always have an accurate visual basis for understanding the position or pose of the robot relative to its environment. However, due to data link latency and low bit rates this ideal scenario is not always realized. In fact, in scenarios where the data link is operating at very low bit rates camera feedback to the operator can be relatively infrequent. For example, in some scenarios, a new image may be presented to the operator only once every five seconds.

When data link latency is substantial it can lead to a mismatch as between user intent and resulting robot motion. Consider that input commands from a user are generally based on feedback from the robot environment in the form of the live motion images and telemetry as described herein. In situations where high data link latency is present the visual imagery and telemetry data presented to a user at the control console may not represent the actual current operating state of the unmanned robotic system. More particularly, the information presented to the user in such a scenario can be latent imagery and latent telemetry communicated from the robotic system at an earlier time. The latency of this feedback data means that it may no longer accurately represent a current pose or state of the robotic system. Such latent imagery can therefore cause a user to misunderstand the control inputs that are required to achieve a desired end. Ultimately, latent feedback data as described herein will negatively impact teleoperation, potentially causing damage to the robotic system and/or objects in the robot environment.

SUMMARY OF THE INVENTION

The invention concerns a method for controlling a robotic system. A control console receives a user input to generate a user robot command. The user robot command will specify a first movement of a robot from a first position to a second position. Thereafter a current pose of the robot is compared to an earlier pose of the robot. If a difference is determined between the current pose and the earlier pose, the user robot command is selectively transformed to a latency-corrected robot command. The latency-corrected robot command specifies a second movement for the robot which is different from the first movement.

The invention also concerns a robotic system. The robotic system includes a processing device and a plurality of robot actuators which are responsive to the processing device to cause a specified motion of the robot. The processing device is configured to respond to one or more user robot commands initiated by a control operator input at a remote control console. A user robot command will specify a first movement of the robot from a first position to a second position. The processing device will compare a current pose of the robot to an earlier pose of the robot. Thereafter, responsive to determining a difference between the current pose and the earlier pose, the processing device will selectively transform the user robot command. In particular, the user robot command will be transformed to a latency-corrected robot command. The latency-corrected robot command specifies a second movement for the robot which is different from the first movement.

BRIEF DESCRIPTION OF THE DRAWINGS

Embodiments will be described with reference to the following drawing figures, in which like numerals represent like items throughout the figures, and in which:

FIG. 6 is a diagram that is useful for understanding how a latency-corrected robot command can be generated.

FIG. 7 is a diagram that is useful for understanding how a latency-corrected robot command can be generated with a specific motion trajectory.

DETAILED DESCRIPTION

The invention is described with reference to the attached figures. The figures are not drawn to scale and they are provided merely to illustrate the instant invention. It should be understood that numerous specific details, relationships, and methods are set forth to provide a full understanding of the invention. One having ordinary skill in the relevant art, however, will recognize that the invention can be practiced without one or more of the specific details or with other methods. In other instances, well-known structures or operations are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

In order to ensure proper control of a robotic system, a control operator is often provided with feedback data which represents to the control operator the state of the robot. Feedback data can be comprised of imagery and/or telemetry data representing the state of the robot. Latent imagery refers to image data presented to a control operator of a teleoperation system, where the image data is substantially delayed and therefore misrepresents the true state of a robot relative to its environment. Similarly, latent telemetry refers to telemetry data presented to the control operator of the teleoperation system, where the telemetry data is substantially delayed and therefore misrepresents the true current state of the robot. Latent feedback data can include latent imagery data, latent telemetry data or both. Latent feedback data most frequently occurs where there is a high latency in a data link between a robot slave device and a control console. The latency in the data link or other processing elements causes feedback data communicated from the slave device to the control console to be delayed prior to the time that it is presented to the control operator. Latent feedback data as described herein will negatively impact teleoperation because it often leads to a mismatch as between user intent and resulting robot operations, such as motion. This mismatch can thwart the efforts of a control operator, damage the robotic system and/or damage objects in the robot environment.

Figure 1:
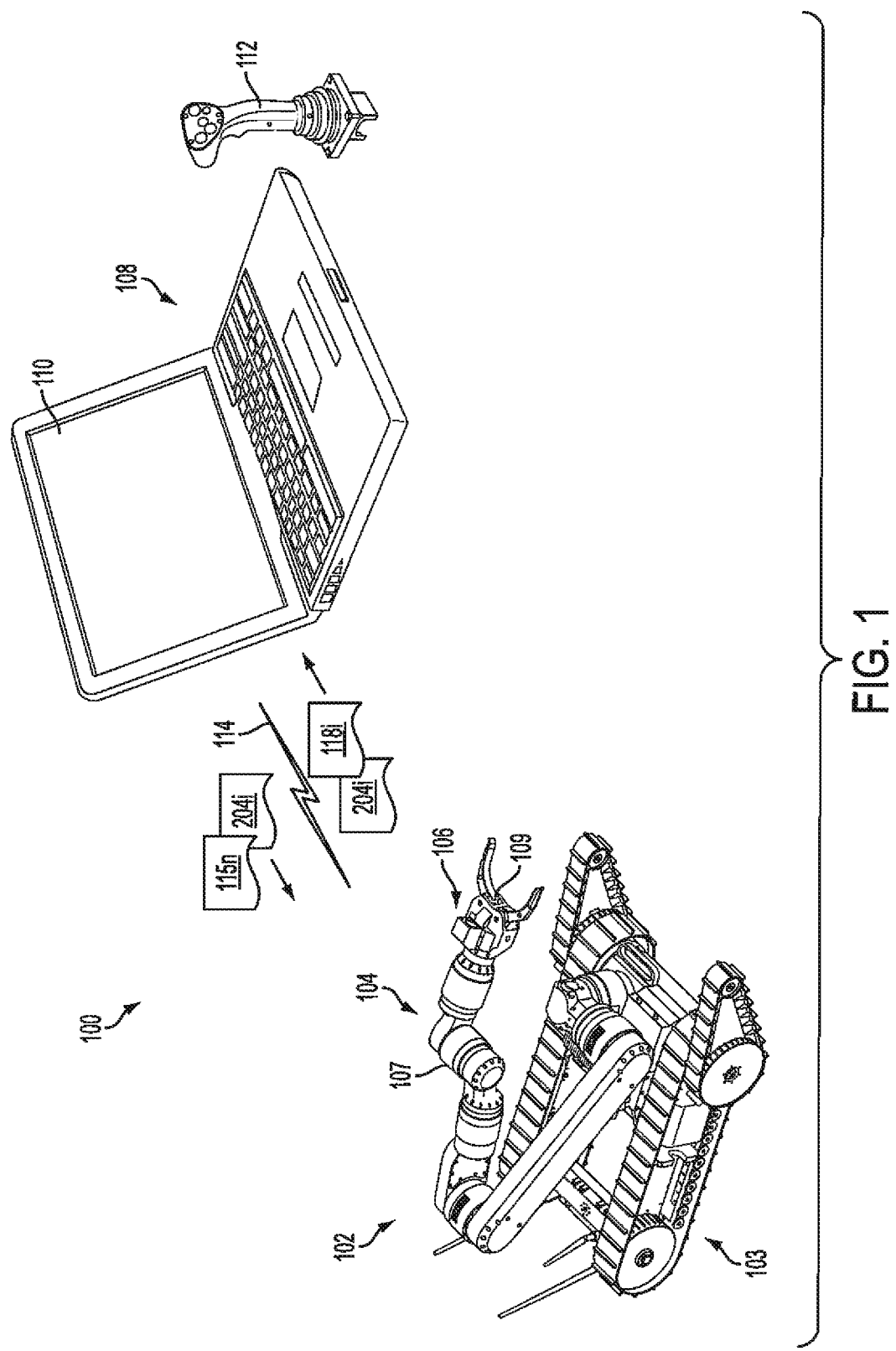
FIG. 1 is a diagram that is useful for understanding a robotic system including a master control console and a remote robotic slave device.

Referring now to FIG. 1 there is shown a robotic system 100 which includes a slave device or robot 102. In this example the robot is an unmanned ground vehicle (UGV) but the slave device can also include other types of slave devices. For example, the robot 102 can be an unmanned aerial vehicle (UAV), unmanned ground vehicle (UGV), unmanned underwater vehicle (UUV) or a robotic manipulator.

The robot 102 has a base 103 and a manipulator 104 which comprises a robot arm 107 and a grasping device 109. A control console 108 can include a video display unit 110 for displaying image data (e.g. motion picture video image data) obtained from a camera 106 mounted on the robot. A hand control 112 senses input control motions of a control operator or user and communicates user input signals to the control console 108. In response, the control console periodically communicates a user robot command $115_i$ to the robot 102 for controlling the movement of the base 103 and/or the robot arm 104. A data link (e.g., a wireless data link) 114 can be implemented by communication circuitry (not shown) for the purpose of communicating command signals to the robot 102. The communication circuitry is also used for communicating feedback data from the robot to the control console. The feedback data can include video image frame data $118_n$ from camera 106 to facilitate presentation of video images on display 110. The feedback data can also include telemetry data from the robot specifying various conditions associated with the robot. For example, the telemetry can provide measurements relating to the position and orientation of the robot. The feedback data is provided to the operator to facilitate understanding of the control inputs that are needed for directing robot motion. The user interface, control console, and communication circuitry together comprise a telematic control system 100 for teleoperation of the UGV.

Figure 2A:
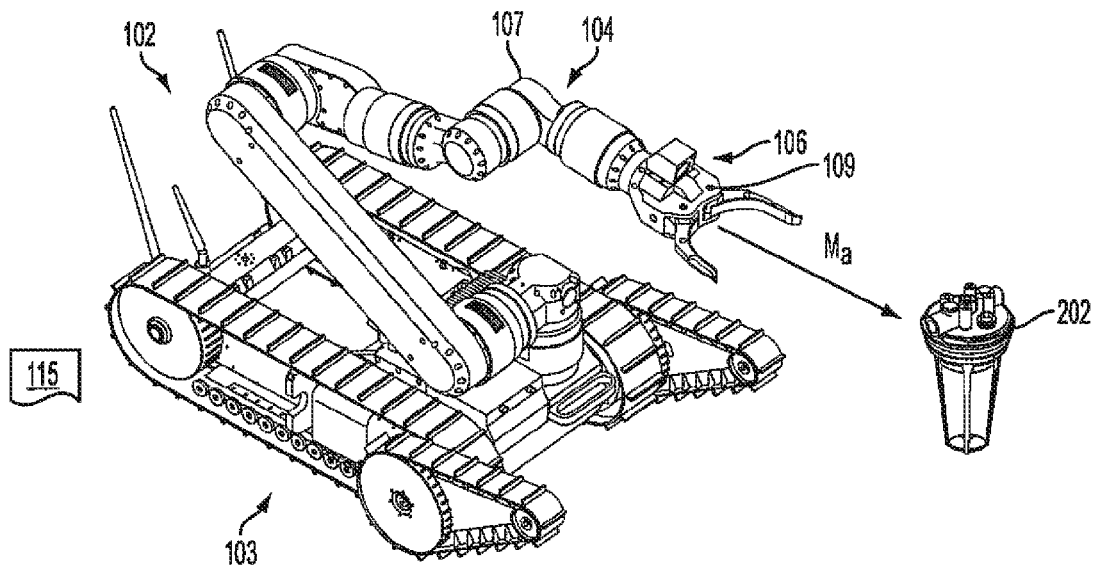
FIGS. 2A and 2B conceptual diagrams that is useful for understanding a solution to a motion control problem which can arise in relation to the robotic system in FIG. 1.

A user robot command $115_n$ transmitted from control console 108 will generally specify a particular movement of the robot from a first position to a second position. The movement specified by the user robot command can involve a command to move the robot base 103, the robot arm 104, or both. The movement commanded in such a scenario can be characterized by a direction and distance that the robot is intended to move, or by a velocity. The foregoing concept is illustrated in FIG. 2A which shows that a user robot command $115_n$ can be received by a robot 102. In this example, the user is attempting to grasp object 202 and therefor commands the robot to perform motion $M_a$. As may be observed in FIG. 1A, the motion $M_a$ as commanded by the user will involve moving the grasping device 108 a particular distance in a particular direction toward object 202.

The user will initiate user robot commands on the basis of the feedback data obtained from the robot. For example, the feedback data could include image frames $118_i$ provided by camera 106. In effect, the displayed images inform the control operator's understanding of the current pose of the robot and thus guide the control operator as to the required robot motion. Similarly, the control operator can rely upon position and orientation type feedback data communicated from the robot. But when a user generates a user robot command $115_n$, the feedback data presented at that moment may not be an accurate representation of the current state of the robot. For example, an image presented on display device 110 may not accurately indicate the true position or pose of a robot arm or robot base. In particular, a delay can arise as a result of the transmission time required to communicate image frame data $118_i$ from the camera 106 to the control console 110. Similarly, a delay can arise in the transmission of other types of telemetry data relied upon by the control operator. Accordingly, at the time when the control operator manipulates hand control 112, the actual pose of the robot may be different as compared to the apparent pose of the robot represented to the control operator at his console and on the display. Consequently, the motion specified by the user robot command will not result in the robot moving to the position actually desired by the operator.

Figure 2B:
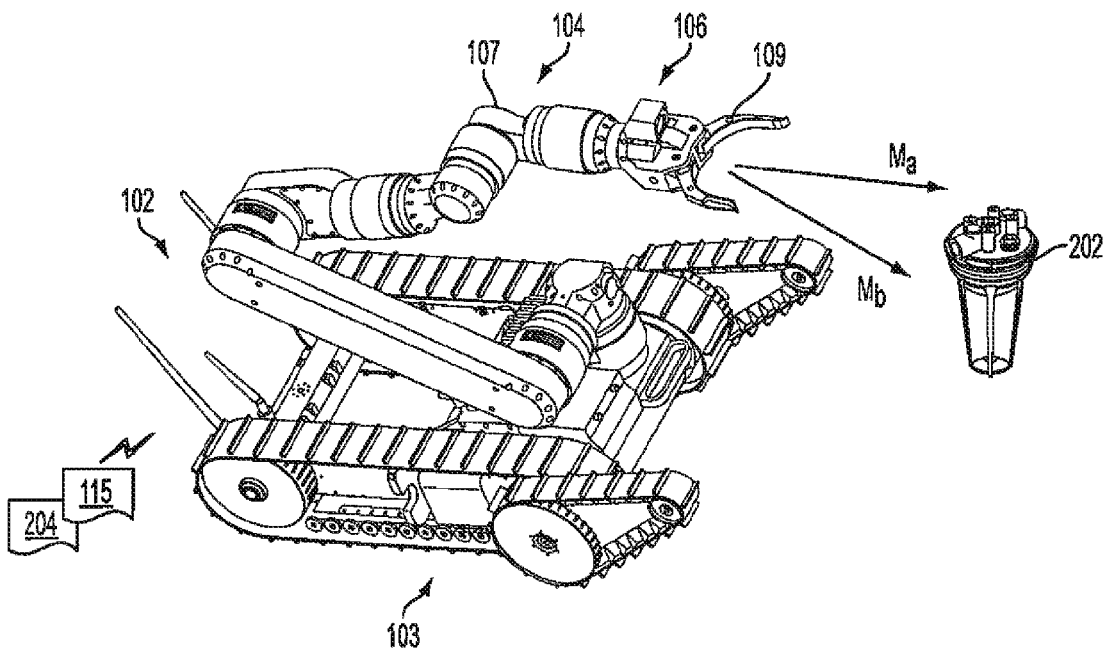

The foregoing concept can be understood with reference to FIG. 2B, which shows a current pose of the robot 102 which is different from an earlier pose shown in FIG. 2A. The current pose can be different from the earlier pose for various reasons. For example, the ground or debris on which the robot is positioned may have shifted. Alternatively, the robot may have changed its pose in response to an earlier user command and the data link latency may delay the presentation of image data resulting from the change in pose. In either scenario, the actual current pose is different from the earlier pose.

The problem of latent feedback data will now be described in more detail. For convenience, the invention shall be discussed in terms of image data latency. However, it should be understood that the problem to be solved and the solution described herein is equally applicable to other types of feedback data communicated from the robot to the control console. Also, the problem of latent feedback data will sometimes be described herein with reference to its adverse effects upon robot pose. Those skilled in the art will appreciate that robot pose can refer to robot position and/or robot orientation. However, it should be understood that the latent feedback data can affect aspects of robot operation beyond its pose. In fact, latent feedback data with respect to any aspect of a robot state can adversely impact a control operator's ability to properly control the robot. Accordingly, the invention concerns systems and methods for overcoming the adverse effects of feedback data latency with respect to robot motion commands, as well as any other commands directed to the robot. These and other aspects of the invention will become apparent as the description of the inventive arrangements continues below.

Assume that data link latency is causing delayed imagery display on display device 110. A control operator generates a user robot command $115_n$ for motion $M_a$ on the basis of the earlier robot state as shown in FIG. 2A. The motion $M_a$ is intended to move the grasping device 109 to contact object 202. If user robot command $115_n$ is received by the robot after the robot pose has changed to that shown in FIG. 2B, then the grasping device will not move toward object 202 as intended. The motion of the robot will be consistent with user robot command $115_n$ but grasping device 109 will fail to contact object 202 because the pose of the robot has changed. This unintended outcome is illustrated in FIG. 2B by the vector arrow representing motion $M_a$ which shows the grasping device 109 will fail to move in the proper direction to reach object 202. To actually achieve the outcome intended by the operator (i.e., contacting object 202 with the grasping device), the robot would have to execute motion $M_b$ in a direction as indicated by the vector arrow as shown. However, it will be appreciated that motion $M_b$ is not the motion specified by the user robot command $115_n$.

Accordingly, after the user robot command $115_n$ is received by the robot, the robot compares a current state of the robot 102 to an earlier state of the robot. For example, this would include a comparison of the current pose of the robot to an earlier pose of the robot. The information evaluated or compared for this purpose can include any information that is useful for comparing a previous positional state of the robot to a current positional state of the robot. For example, the information which is evaluated can include a position of a robot arm 107 with respect to the base 103 of the robot, the geographic position of the base with respect to the earth, and/or an orientation of the base with respect to the earth. Still, the invention is not limited in this regard and other informational aspects of robot pose can also be evaluated for purposes of the present invention without limitation.

The current pose will generally be a pose of the robot 102 at the time when the user robot command $115_n$ is received at the robot, but it can also be the robot pose at the time when the robot is ready to act upon the command. The earlier pose is the pose of the robot 102 at the time when the user input was received from the user at the control console 108. The user input is based on a user observation of a displayed image (e.g. image frame $118_i$) associated with the earlier pose of the robot.

The state comparison described herein is advantageously performed by processing elements located at the robot 102 so that the most current information is being evaluated. Based on the state comparison, the robot 102 determines a difference between the current state of the robot and the earlier state. The robot then uses this difference information to selectively transform the received user robot command $115_n$ to a latency-corrected robot command. In the scenario described herein, the latency corrected robot command will specify a latency corrected movement $M_b$ for the robot which is different in one or more respects as compared to the movement $M_a$ commanded by the control operator. For example, the two commands can be different with respect to a direction of the robot movement which is commanded, a distance the robot has been commanded to move, or both.

In some scenarios, the movement $M_a$ can be defined by the user robot command in terms of a velocity, including a speed and direction of movement for the robot. In such a scenario, the latency corrected movement $M_b$ as specified by the latency corrected robot command can be similarly defined by a second velocity. After the transforming step described herein, the velocity associated with movement $M_b$ will be different as compared to the velocity associated with movement $M_a$. The latency corrected movement $M_b$ can also be selected in such a way as to obtain a particular motion trajectory. For example, the motion trajectory of the robot defined by the latency corrected movement $M_b$ can be selected to at least partially align with a motion trajectory which would have resulted from the movement $M_a$ if the pose of the robot had remained the same.

In order to determine the appropriate earlier state for purposes of comparison, the user robot command $115_n$ can be provided to the robot 102 together with at least one item of metadata $204_i$. For example, the user robot command 115 and the corresponding metadata $204_i$ can be provided to the robot 102 over the wireless data link. The robot 102 maintains a log or data store in, which two or more robot state definitions are stored. Each state definition specifies a pose of the robot at a point in time preceding receipt of the user robot command $115_n$ at the robot. After the user robot command $115_n$ is received, the robot uses the metadata $204_i$ to identify the appropriate or correct earlier pose from the set of state definitions stored in its log. In particular the robot 102 will use the metadata $204_i$ to determine the exact pose of robot 102 as would have been understood by the control operator at the time the user command was initiated.

An exemplary type of metadata $204_i$ that can be used for the purposes described herein will uniquely identify each frame of image data communicated from the robot to the control console. For example, the metadata $204_i$ can be a time stamp which specifies a time when a particular image frame $118_i$ is captured. The metadata $204_i$ is then attached or associated with a corresponding frame of image data $118_i$ that is communicated from the robot 102 to the control console 108. When a user robot command $115_n$ is generated at the console, metadata $204_i$ is attached or associated with the particular user robot command. The particular metadata $204_i$ attached to a user robot command will correspond to the image data that was being presented to the control operator at the time the user robot command was generated. Accordingly, when the user robot command $115_n$ is received by the robot 102, it can evaluate the corresponding metadata $204_i$ to determine its state or pose as understood by the control operator at the time the user robot command was initiated. For example, if the metadata specifies a time stamp value $t_i$ then the robot will understand that the user robot command was generated on the basis of robot conditions corresponding to an earlier time $t_i$. The robot can then consult its log to determine its state at such earlier time $t_i$ and can compare that state to its current state. Since robot state includes pose, this comparison would include a comparison of the robot pose at such earlier time to the current robot pose.

The time stamp methodology described herein is one way for the robot to determine the control operator's knowledge of a robot state at the time a user robot command is initiated. Still, it should be appreciated that other approaches can also be used, including other types of metadata for accomplishing a similar result. Such metadata can include timing information, non-time based index values, and so on. Further it will be appreciated that the metadata could be estimated by the robot based on evaluation of data link latency. For example, the robot can evaluate the data link and determine that link conditions are such that each frame of video data is being delayed approximately 5 seconds before being received and displayed at the control console. This would indicate that the operator initiated actions are based on robot pose conditions from a time which is at about 5 seconds earlier. Such estimated metadata could then be used by the robot to estimate the earlier state or pose of the robot at the time when the user robot command was generated. In such a scenario, the metadata could be generated at the robot rather than being communicated from the control console with the user robot command $115_n$. Data link evaluation could include evaluation of a bit error rate (BER), signal strength and/or other factors useful for evaluating data latency on the data link. The inventive arrangements described herein are intended to encompass any method now known or known in the future for determining or estimating an earlier state of the robot upon which a user robot command was based.

Figure 3:
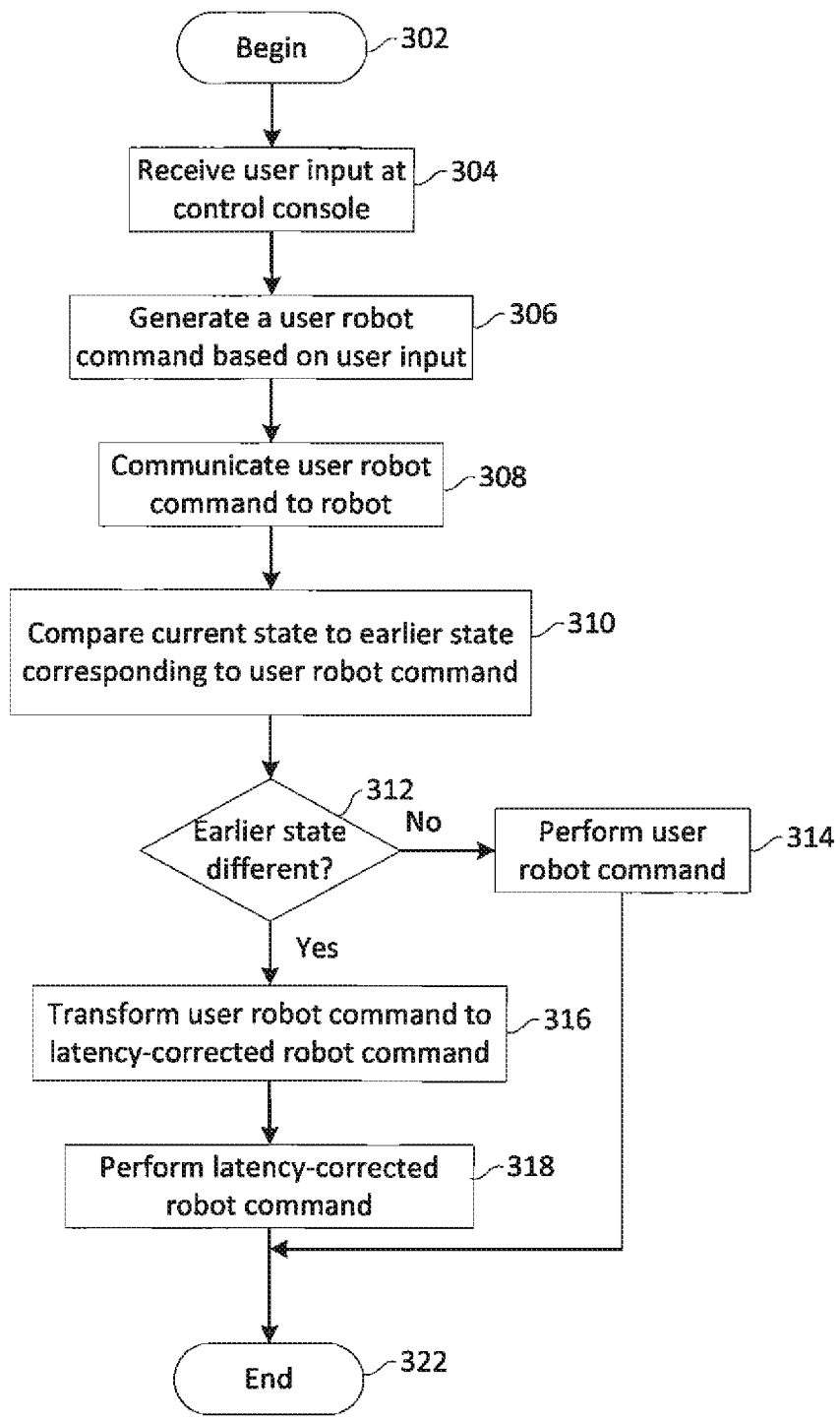
FIG. 3 is a flowchart that is useful for understanding a process for preventing motion control errors.

Referring now to FIG. 3, there is shown a flowchart that is useful for understanding the foregoing process. The process begins at step 302 and continues to step 304 where a user input is received at a control console 108. In step 306 a user robot command 115 is generated at the control console based on the user input. This user robot command 115 is communicated to the robot 102 in step 308. In step 310 the current state of the robot 102 is compared to an earlier state. This state comparison can be facilitated by the use of the metadata (e.g. time stamp metadata) as described above. The earlier state corresponds to the state of the robot as understood by the control operator based on available feedback data. For example, a control operator can understand an earlier pose of the robot based on a video image display (e.g. video image data 118) and/or other types of telemetry data. In step 312 a determination is made as to whether the earlier state of the robot specified by the metadata is different as compared to the current state of the robot. This can include a determination as to whether the earlier pose is different from a current pose. If not (312: No) then the process continues on to step 314 and the robot 102 performs actions (e.g., movements) in accordance with the user robot command. However, if the earlier state is different as compared to the current state (312: Yes) then the robot will transform the user robot command in step 316 to a latency corrected robot command. For example, if an earlier robot pose is different as compared to a current robot pose, then the robot will transform the user robot command for a first motion to a latency corrected robot command for a somewhat different motion. After this transformation, the process continues on to step 318 where the latency-corrected robot command is performed by the robot. Thereafter the process can terminate at step 322. Alternatively, the process can continue as additional user commands are received.

Figure 4:
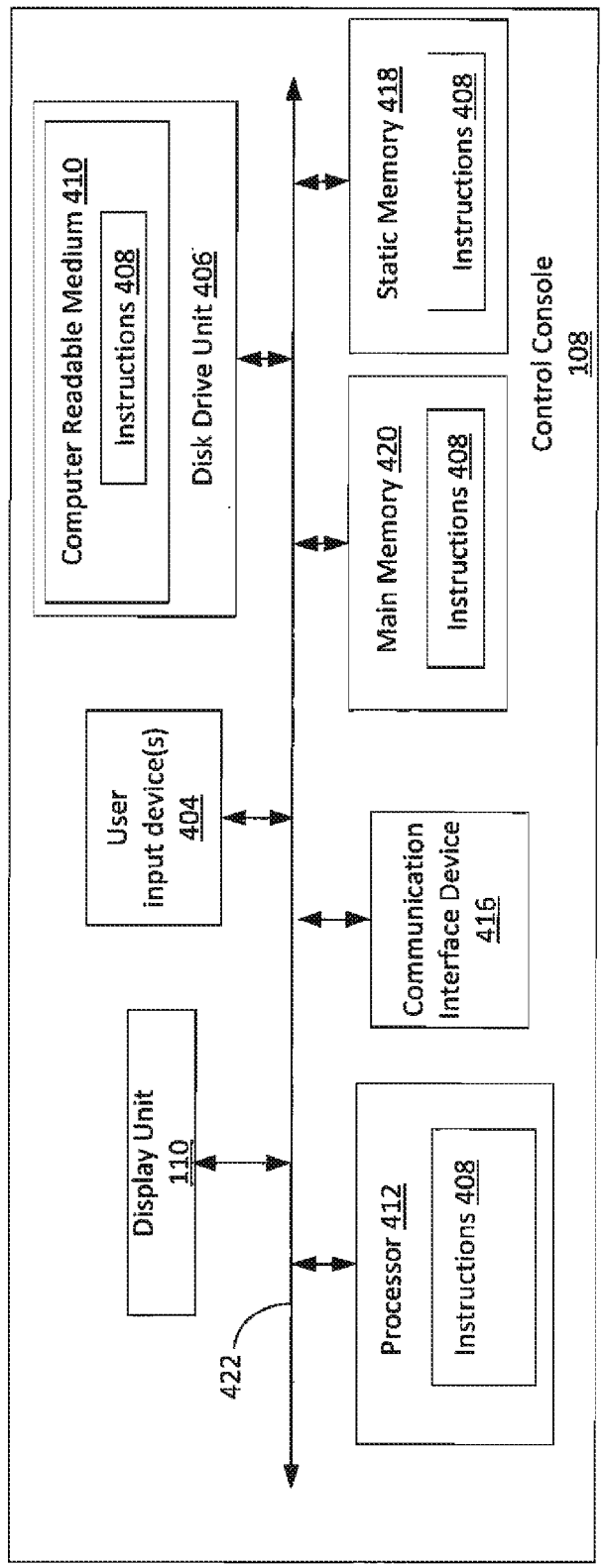
FIG. 4 is a block diagram that is useful for understanding a control console used in the robotic system of FIG. 1.

Referring now to FIG. 4, there is provided a block diagram which is useful for understanding a control console 108. The control console includes a processor 412 (such as a central processing unit (CPU), a graphics processing unit (GPU, or both), a disk drive unit 406, a main memory 420 and a static memory 418, which communicate with each other via a bus 422. The control console 108 can further include a display unit 110, such as a video display (e.g., a liquid crystal display or LCD), a flat panel, a solid state display. The control console 108 can include one or more user input devices 404 such as a keyboard and a hand control 112. The control console can also include a communication interface device 416 for implementing wireless data link communications as described herein.

The disk drive unit 406 includes a computer-readable storage medium 410 on which is stored one or more sets of instructions 408 (e.g., software code) configured to implement one or more of the methodologies, procedures, or functions described herein. The instructions 408 can also reside, completely or at least partially, within the main memory 420, the static memory 418, and/or within the processor 412 during execution thereof. The main memory 420 and the processor 412 also can constitute machine-readable media.

Those skilled in the art will appreciate that the control console architecture illustrated in FIG. 4 is one possible example of a control console. However, the invention is not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations.

Figure 5:
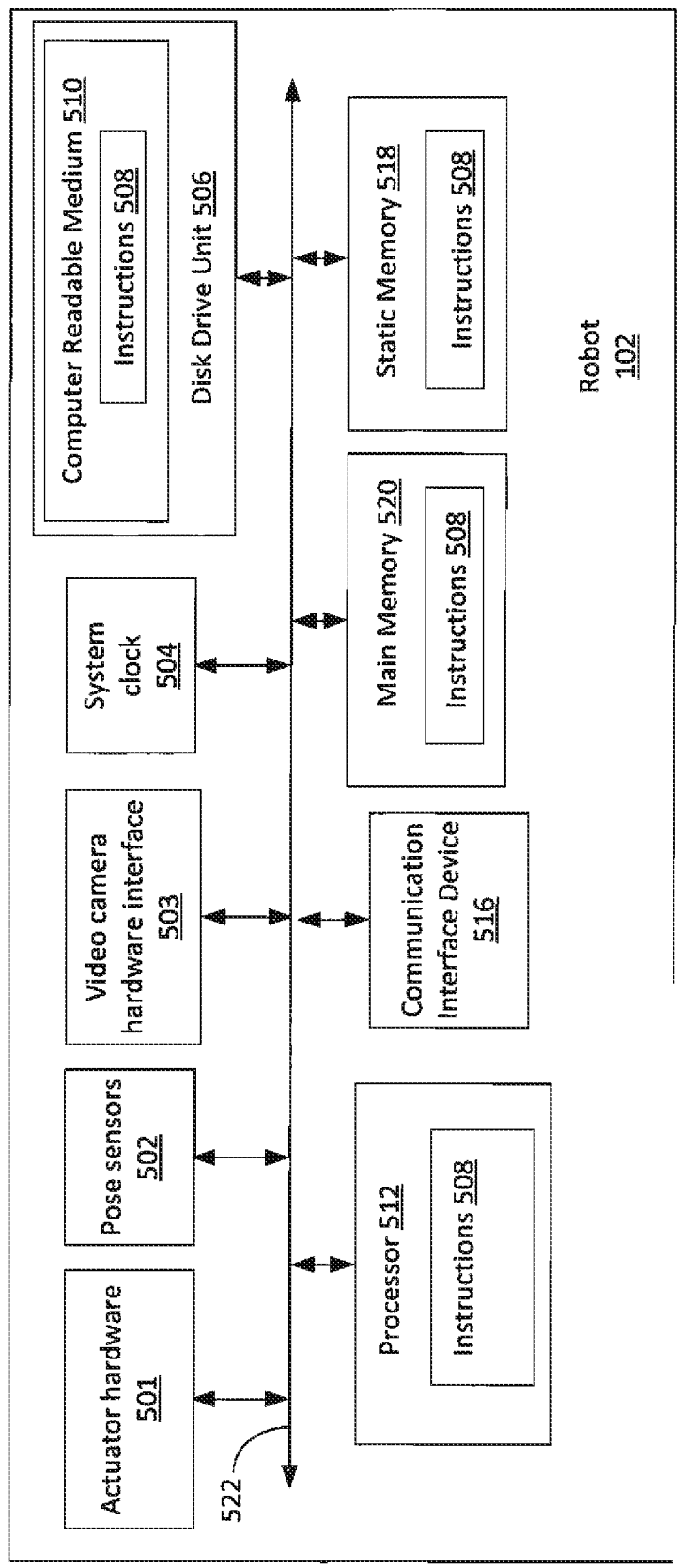
FIG. 5 is a block diagram that is useful for understanding a robot slave device used in the robotic system of FIG. 1.

Referring now to FIG. 5, there is provided a block diagram which is useful for understanding a robot 102. The robot includes a processor 512 (such as a central processing unit (CPU), a disk drive unit 506, a main memory 520 and a static memory 518, which communicate with each other via a bus 522. The robot 102 can further include actuator hardware 501, pose sensors 502, video camera hardware interface 503, system clock 504. The robot 102 can also include a communication interface device 516 for implementing wireless data link communications as described herein.

The disk drive unit 506 includes a computer-readable storage medium 510 on which is stored one or more sets of instructions 508 (e.g., software code) configured to implement one or more of the methodologies, procedures, or functions described herein. The instructions 508 can also reside, completely or at least partially, within the main memory 520, the static memory 518, and/or within the processor 512 during execution thereof.

The processor 512 controls movements of the robot by communicating with actuator hardware 501. The actuator hardware can include servos, motors, and other types of actuators as necessary to cause movement of the robot base 103 and the manipulator 104. These actuators can be of the electro-mechanical, pneumatic, and/or hydraulic type. The robot 102 also includes pose sensors 502 which can sense various parameters that define a robot pose. For example, the pose sensors 503 can include sensors for determining a position of a plurality of joints comprising a robot manipulator 104. The pose sensors can also include sensors for determining an orientation of the robot relative to the earth. For example, these sensors can measure pitch, roll and yaw of the robot about three orthogonal axes. The pose sensors 502 can also include a GPS device (or other type of position sensing system) that is capable of detecting an absolute position of the robot 102 with respect to the surface of the earth. Not all of the pose sensors described herein necessarily need be included in a particular robot implementation. Instead, the various pose sensors 502 that are selected for inclusion in the robot 102 will be sufficient to adequately determine a robot pose for carrying out the inventive processes described herein.

System clock 504 is provided to maintain a reference time standard that can be used to keep track of the robot state over a period of time. For example, the system clock 504 can be used to periodically index or time stamp pose sensor information. The indexed or time stamped state information can be stored in a database to create a log which is sufficient to specify the pose history of the robot at each of a plurality of periodic intervals for some period of time. For example, the log can be maintained so as to specify the state of the robot at a plurality of periodic intervals for the previous 30 seconds. In order to conserve memory resources, this state information can be continually updated with newer state data as older state data is deleted. The periodic intervals at which state information is recorded can be determined by the designer, but a suitable interval could be once every 0.1 seconds, for example. The system clock 504 can also be used to generate metadata in the form of time stamps which are applied image data from the video camera interface. These time stamps or metadata can be communicated with the image data to the control console. Similarly, time stamps can be applied to other types of telemetry data.

Those skilled in the art will appreciate that the robot system architecture illustrated in FIG. 5 is one possible example of a robot system. However, the invention is not limited in this regard and any other suitable system architecture can also be used without limitation. Dedicated hardware implementations of the computer processing circuitry described herein include, but are not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations.

Referring now to FIG. 6 there is shown a drawing that is useful for understanding a transformation of a user robot command to a latency-corrected robot command. Following is one possible exemplary method for determining a latency-corrected robot command based on a user robot command. The transformation method described is not intended to be limiting but is instead presented to facilitate understanding of the inventive arrangements described herein. For purposes of this example it will be assumed that a robot 102 uses robot state information to determine a position of a robot 102 and its grasping device 109 in three dimensional space. Assume that at time $t_1$ the grasping device is at position A. Based on observation of displayed video image data obtained while the grasping device was at position A, a control operator generates a user robot command specifying motion M(A, T). Motion M(A,T) is generated by the user with the intent of causing the grasping device to move from position A to a target position T. The user robot command is then communicated from the control console to the robot. At time $t_2$ when the user robot command is received, robot 102 consults information specifying its current state or pose and determines that the grasping device 109 is currently at position B. The robot uses the metadata associated with the user robot command to determine that the user robot command was initiated based on video image data (and/or telemetry data) obtained at time $t_1$ (when the grasping device was at position A). The robot compares position A to position B and determines the two positions are different. Accordingly, the robot determines a latency-corrected motion M(B, T) for grasping device 109 that will cause the grasping device to move from position B to position T. The latency corrected command is then used to control the necessary robot actuator hardware for accomplishing the movement M(B, T).

The latency corrected command can be determined by first determining a position T that would have resulted from motion M(A, T) as specified by the control operator. The robot can then determines a motion that will be sufficient to move the grasping device 109 from its current position B to the target position T.

There are some scenarios where it is sufficient for a robot (e.g. a robot grasping device 109) to simply move along any arbitrary motion trajectory provided that it ultimately arrives at a target position T. In such scenarios, a motion M(B, T) is a satisfactory latency-corrected motion. However, there are some activities where simply arriving at a desired end point T is insufficient. For example, consider a scenario in which an elongated key must be inserted into a key hole to open a lock. The key cannot be inserted along any trajectory but must instead be inserted along a specific trajectory aligned with an insertion axis associated with the lock. Accordingly, a transformation of a user robot command to a latency-corrected robot command can attempt to align at least a portion of a motion trajectory of the latency-corrected robot command with the intended motion trajectory (as indicated by the user robot command).

The foregoing scenario is illustrated in FIG. 7 which shows that at time $t_3$ the grasping device is at position A'. Based on observation of displayed video image data obtained while the grasping device was at position A', a control operator generates a user robot command specifying motion M(A',T'). Motion M(A', T') is generated by the user with the intent of causing the grasping device to move from position A' to a target position T' along a specific trajectory defined by the vector line associated with M(A', T'). The user robot command is then communicated from the control console to the robot. At time $t_4$ when the user robot command is received, robot 102 consults information specifying its current state and determines that the grasping device 109 is currently at position B'. The robot uses the metadata associated with the user robot command to determine that the user robot command was initiated based on telemetry and/or video image data obtained at time $t_3$ (when the grasping device was at position A'). The robot compares position A' to position B' and determines the two positions are different. Accordingly, the robot determines a latency-corrected motion M(B', T') for grasping device 109 that will cause the grasping device to move from position B' to position T'. However, rather than simply moving from B' to T' along any trajectory, one or more latency corrected motion commands are generated that will approximate at least a portion of the trajectory associated with M(A', T'). The latency corrected command motion command (or commands) are then used to control the necessary robot actuator hardware for accomplishing the movement M(B', T').

The latency corrected command can be determined by first determining a position T' and a robot trajectory of motion that would have resulted from motion M(A', T') as specified by the control operator. The robot can then determine a motion that will be sufficient to move the grasping device 109 from its current position B' to the target position T' while following at least a portion of the trajectory that would have been defined by motion M(A', T'). In FIG. 7, the latency corrected motion is only partially aligned with the motion M(A', T'). However, it should be understood that the invention is not limited in this regard and the location of C' can be adjusted to coincide with A' so that the trajectory or path alignment is maximized. In such a scenario, the latency corrected robot command would be chosen to cause robot grasping device 109 to first move to point A' and then follow a trajectory defined by motion M(A', T').

In FIGS. 6 and 7 the invention has been described in relation to motion of a grasping device 109. However, the invention is not limited to transforming motion commands associated with a grasping device or manipulator. Instead, the latency corrected motion commands as described herein can also be used for controlling the movements of a robot base 103. In such a scenario, the positions A and B (or A', B', and C') can refer to a position of the robot base 103. If the robot 102 is a UGV then the movement of the base will normally take place in two dimensions rather than three dimensions. However, if the robot 102 is an unmanned aerial vehicle (UAV) or unmanned underwater vehicle (UUV) then the motions of the robot vehicle base can involve movements in three dimensions.

Also, it should be appreciated that the examples provided in FIGS. 6 and 7 are described in terms of the position of a robot as it is moved along a trajectory from a first location to a defined target. However, the inventive arrangements described herein can also apply to the orientation of the robot (e.g., the orientation of a robot grasping device) as it moves along a trajectory. Accordingly, the latency corrected robot command is advantageously chosen to cause robot grasping device 109 to first move to point A' and then follow a trajectory defined by motion M(A', T') while also maintaining a grasping device orientation as would have been defined by motion M(A', T')

Figure 8A:
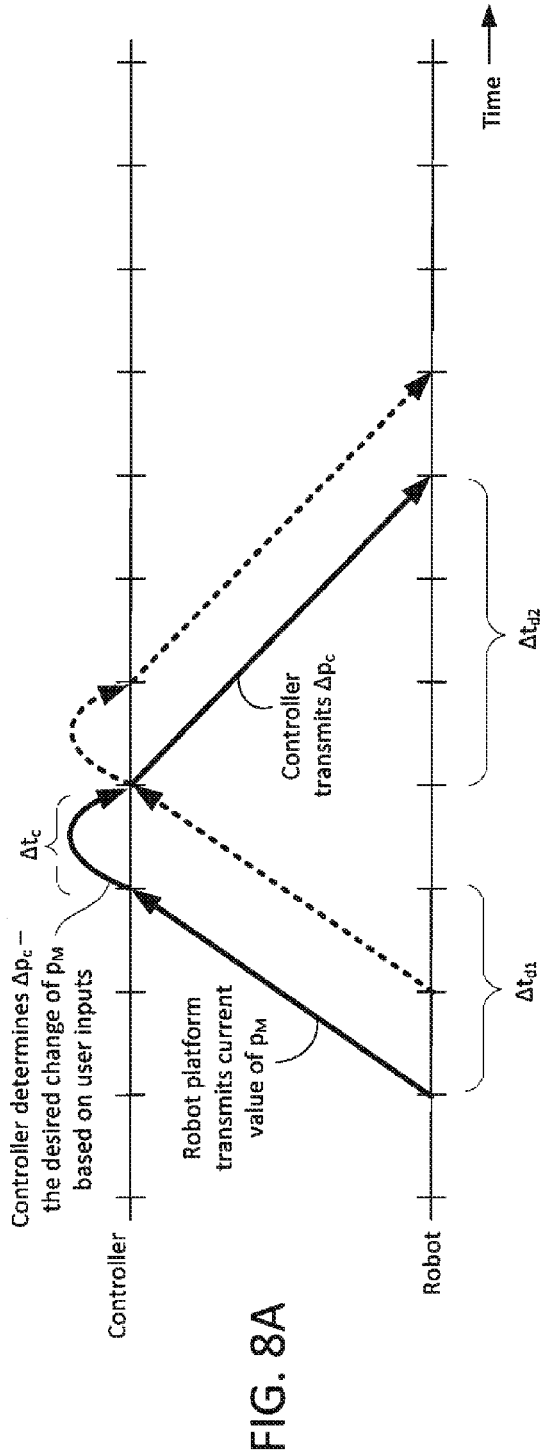
FIG. 8A is a timing diagram that is useful for understanding the effects of latency in a in a telematic system.
Figure 8B:
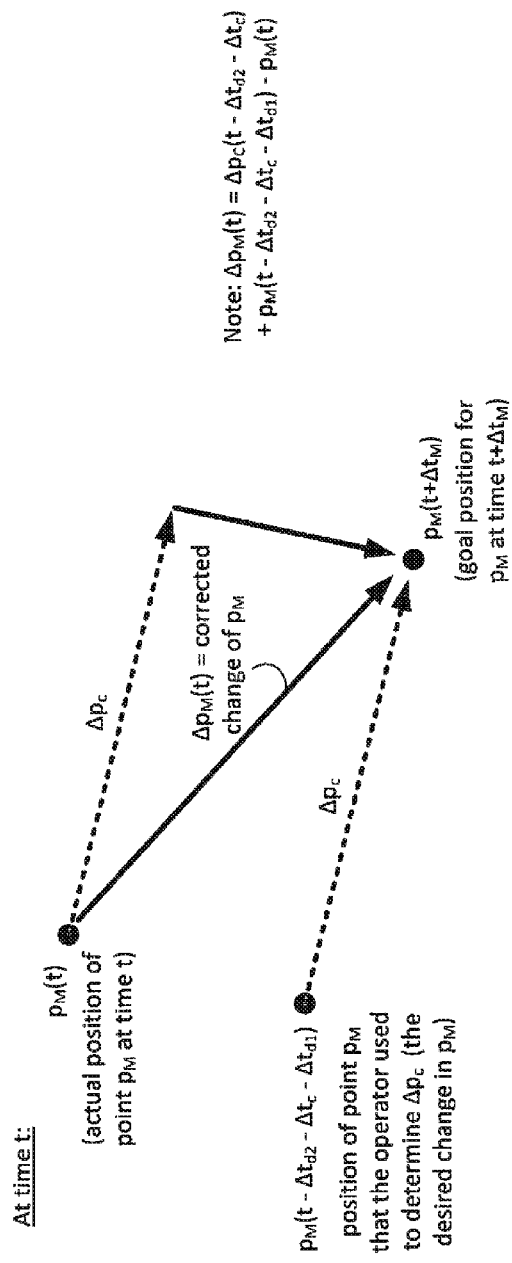
FIG. 8B is a diagram that is useful for understanding a corrected motion control command that can be generated where latency exists in a telematic system

The inventive arrangements will now be described in further detail in relation to the example which is illustrated in FIGS. 8A and 8B. For convenience in understanding the invention, the example concerns only the position of an end of a robotic arm. However, the same principles apply to correcting the orientation of a robot arm, or the position/orientation of any part of the mobile robot platform that is being controlled. As shown in FIG. 8A, a mobile robot platform periodically transmits to a controller a current value of $p_M$, which represents the position of the end of the robot arm. Due to system latency, there is a certain delay $\Delta t_{d1}$ associated with the communication of this information from the robot to the controller. Subsequently, there is a delay $\Delta t_c$ associated with the time required for the controller to determine $\Delta p_c$—the desired change of $p_M$ based on user/control operator inputs. There is a further latency associated with the communications from the controller to the robot which is represented as $\Delta t_{d2}$ such that the command from the control operator finally arrives at the robot at time t. The performance of the actual movement at the robot also takes some time, and this time is represented as $\Delta t_M$. The dotted lines in FIG. 8A represent subsequent communications between the robot and the controller occurring at periodic intervals.

Referring now to FIG. 8B, it may be observed that the end of the robot arm has at time t a particular position $p_M(t)$. It will be appreciated by those skilled in the art that $p_M(t)$ is a function of s(t), the state of the mobile robot platform (e.g. joint angles, platform position/orientation, and so on). Calculation of $p_M$ from s is known in the art. An operator initiates a motion command $\Delta p_c$ (the desired change in $p_M$) based on latent data presented to him at the control console. This data is delayed by an amount $\Delta t_{d1}$. As noted above, additional delays $\Delta t_c$ and $\Delta t_{d2}$ are introduced as the control inputs are processed and then communicated to the robot. The total, delay from the time the robot communicates its current position information to the time that a user command is received can be represented as $\Delta t_{d2} + \Delta t_c + \Delta t_{d1}$.

When the user command finally arrives at the robot for processing the end of the arm may have a position $p_M(t)$ which was not in accordance with the operator's understanding at the time his control commands were initiated. In order to overcome this deficiency, the robot will calculate a new or corrected change in position or movement which is to be applied to the end of the robot arm. The new movement $\Delta p_M(t)$ will calculated based on $\Delta p_c$ (the change in position as specified by the control operator based on the position or state of the robot as represented to the control operator at the time the user initiated the command), the actual position of the robot arm at time t, and the earlier position (upon which the control operator based the command). Specifically, $\Delta p_M(t) = \Delta p_C(t - \Delta t_{d2} - \Delta t_c) + p_M(t - \Delta t_{d2} \Delta t_c - \Delta t_{d1}) - p_M(t)$. It is assumed that previous values of $p_M$ have been saved in memory so that past values can be used for the above calculation.

The inventive arrangements herein have generally been described with reference to robot pose and to correcting robot motion commands to overcome the negative effects of latent feedback data. However, latent feedback data can also adversely impact a control operator's ability to properly control other aspects of robot operations. Accordingly, the method for providing latency corrected robot commands as disclosed herein can be used to correct any robot control commands that may be adversely affected by the problem of feedback data latency. Also, while the invention has been described with regard to robot pose, it should be understood the inventive arrangements are directed more generally to a robot state rather than being limited to robot pose. As will be appreciated by those skilled in the art, robot pose is just one aspect of an overall state of a robot.

In accordance with various embodiments of the present invention, the methods described herein are stored as software programs in a computer-readable storage medium and are configured for running on a computer processor. Furthermore, software implementations can include, but are not limited to, distributed processing, component/object distributed processing, parallel processing, and virtual machine processing. While the computer-readable storage mediums 410, 510 are shown in an exemplary embodiment to be a single storage medium, the term "computer-readable storage medium" should be taken to include a single medium or multiple media that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. For example the term "computer-readable medium" can include, but is not be limited to, solid-state memories such as a memory card or other package that houses one or more read-only (non-volatile) memories, random access memories, or other re-writable (volatile) memories; magneto-optical or optical mediums such as a disk or tape. Accordingly, the disclosure is considered to include any one or more of a computer-readable medium as listed herein and to include recognized equivalents and successor media, in which the software implementations herein are stored.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

We claim:

1. A method for controlling a robotic system, comprising:
receiving, at a control console, a user input to generate a user robot command specifying a first action involving a change of position for at least one portion of a robot;
comparing a current pose of the robot to an earlier pose of the robot, where the earlier pose comprises a pose of the robot at a time when the user input was received by the control console; and
responsive to determining a difference between the current pose and the earlier pose, selectively transforming the user robot command to a latency-corrected robot command that will cause the at least one portion of the robot to transition from a current position to a desired position indicated by the user input;
wherein the transforming step comprises determining a trajectory of motion that would have resulted from the robot's performance of the first action specified by the user robot command if the robot had remained in the earlier pose, determining an intersect movement that will cause the at least one portion of the robot to transition from the current position displaced from the trajectory of motion to an intermediate position which is disposed along the trajectory of motion, and determining an alignment movement that will cause the robot to transition from said intermediate position to the desired position along the trajectory of motion.

2. The method according to claim 1, wherein said first action includes a change of orientation for the at least one portion of the robot.

3. The method according to claim 2, wherein said comparing further comprises comparing a current orientation of the robot to an earlier orientation of the robot.

4. The method according to claim 1, further comprising selecting the current pose to comprise a pose of the robot at a time when the user robot command is received at the robot.

5. The method according to claim 1, wherein said intersect movement is exclusive of said trajectory of motion.

6. The method according to claim 1, wherein said comparing is performed at said robot, remote from said control console.

7. The method according to claim 6, wherein said selectively transforming is performed at said robot, remote from said control console.

8. The method according to claim 1, further comprising communicating the user robot command and at least one metadata corresponding to said user robot command from said control console to said robot over a wireless data link.

9. The method according to claim 8, further comprising determining at said robot said earlier pose based on said metadata.

10. The method according to claim 9, further comprising accessing at said robot a database containing a plurality of state definitions, each said state definition specifying a state of said robot at a point in time preceding receipt of said user robot command at said robot, and selecting an earlier state from said plurality of state definitions based on said metadata.

11. The method according to claim 1, wherein the current pose and the earlier pose each specify a position of a manipulator of said robot with respect to a base of said robot.

12. The method according to claim 1, wherein the current pose and the earlier pose each specify a geographic position of the base with respect to the earth.

13. The method according to claim 1, wherein the current pose and the earlier pose each specify an orientation of the base with respect to earth.

14. The method according to claim 1, further comprising estimating said earlier pose based on an evaluation of communication conditions existing on a data link between said robot and said control console.

15. A robot, comprising:
a processing device;
a plurality of actuators responsive to said processing device for causing motion of said robot;
wherein said processing device is configured to
respond to a user robot command initiated by a control operator input at a remote control console, said user robot command specifying a first action involving a change of position for at least one portion of the robot,
compare a current pose of the robot to an earlier pose of the robot, where the earlier pose comprises a pose of the robot at a time when the control operator input was received by the remote control console; and
responsive to determining a difference between the current pose and the earlier pose, selectively transform the user robot command to a latency-corrected robot command that will cause at least one portion of the robot to transition from a current position to a desired position indicated by the user robot command;
wherein the transform comprises determining a trajectory of motion that would have resulted from the robot's performance of the first action specified by the user robot command if the robot had remained in the earlier pose, determining an intersect movement that will cause the at least one portion of the robot to transition from the current position displaced from the trajectory of motion to an intermediate position which is disposed along the trajectory of motion, and determining an alignment movement that will cause the robot to transition from said intermediate position to the desired position along the trajectory of motion.

16. The robot according to claim 15, wherein the first action includes a change of orientation for the at least one portion of the robot.

17. The robot according to claim 15, wherein the current pose includes a current orientation of the robot.

18. The robot according to claim 15, wherein the current pose is a pose of the robot at the time when the user robot command is received at the robot.

19. The robot according to claim 15, wherein said intersect movement is exclusive of said trajectory of motion.

20. The robot according to claim 15, wherein said processing device is further configured to determine said earlier pose based on metadata communicated from said remote control console.

21. The robot according to claim 20, wherein said processing device is further configured to access a local database at said robot containing a plurality of state definitions, each said state definition specifying a state of said robot at a point in time preceding receipt of said user robot command at said robot, and to select an earlier state from said plurality of state definitions based on said metadata.

22. The method according to claim 1, wherein the intersect movement is determined so as to maximize the alignment movement.

23. The robot according to claim 15, wherein the intersect movement is determined so as to maximize the alignment movement.

* * * * *